United States Patent [19]

Pishioneri

[11] 4,071,733

[45] Jan. 31, 1978

[54] HOLDER FOR WELDING ELECTRODE

[76] Inventor: Philip J. Pishioneri, 309 Joffre St., Ellwood City, Pa. 16117

[21] Appl. No.: 757,163

[22] Filed: Jan. 6, 1977

[51] Int. Cl.² ............................................... B23K 9/28
[52] U.S. Cl. ...................................... 219/141; 81/395; 219/138; 219/144
[58] Field of Search ................. 81/382, 395, 398, 399; 219/70, 138, 139, 140, 141, 142, 143, 144

[56] References Cited

U.S. PATENT DOCUMENTS

| 2,336,712 | 12/1943 | Bourque | 219/144 |
| 2,394,204 | 2/1946 | Randall | 219/144 |
| 2,395,213 | 2/1946 | Bourque | 219/141 |
| 3,717,744 | 2/1973 | Pishioneri | 219/138 |

Primary Examiner—J. V. Truhe
Assistant Examiner—N. D. Herkamp
Attorney, Agent, or Firm—Dowell & Dowell

[57] ABSTRACT

An electrode holder to be connected to a welding current cable and having a pair of jaw support members pivoted to a tubular member therebetween which has a bore receiving said cable, the cable being connected by separate conductors to electrode gripping jaw pieces in said support members, and a pair of springs separately urging the respective jaw support members about said pivot to bring the jaw pieces together and clamp an electrode therebetween, the ends of the springs being supported in a collar which surrounds the tubular member and is adjustable longitudinally thereof to adjust the spring pressure closing said jaw pieces.

9 Claims, 8 Drawing Figures

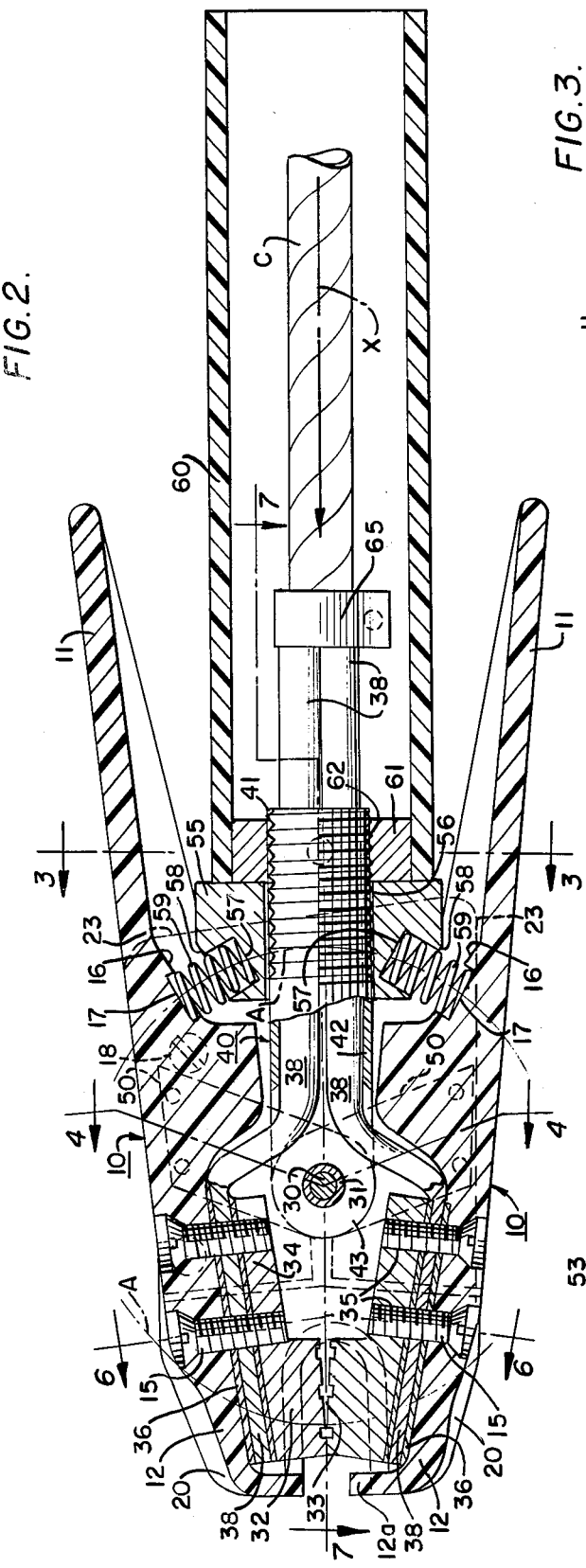
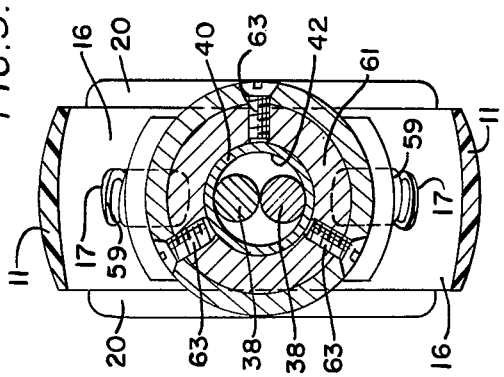
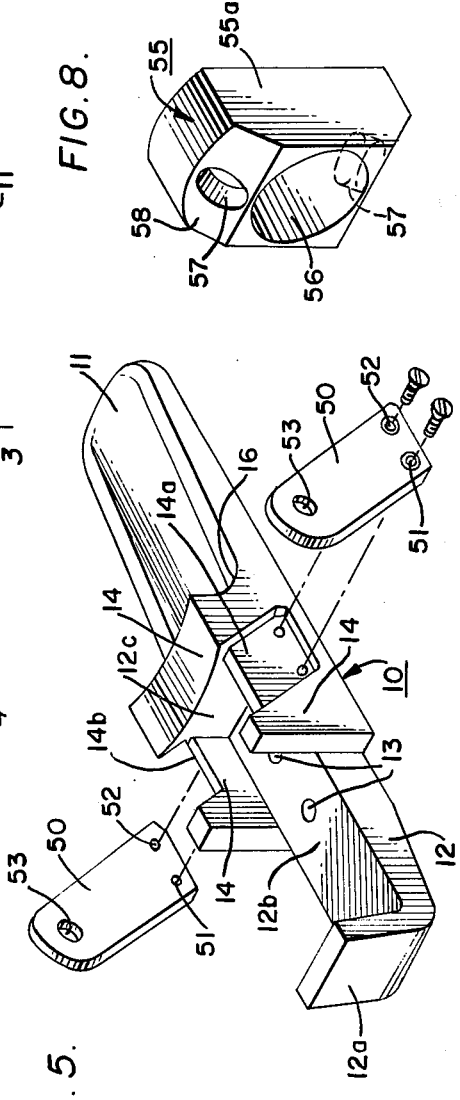

HOLDER FOR WELDING ELECTRODE

FIELD OF INVENTION

This invention relates to electrode holders of the type commonly used in electric welding, and more particularly relates to improvements in jaw-type holders in which each jaw is individually spring-urged to close on the electrode and the closing pressure of each jaw is provided by its own spring independently of the opposing jaw.

BACKGROUND AND PRIOR ART

An invention is disclosed in my U.S. Pat. No. 3,717,744, issued Feb. 20, 1973 teaching an ELECTRODE HOLDER having a handle member and two jaws pivotally connected thereto and urged together by adjustable spring means, the current conducting wire which enters the holder being divided into two flexible conductors which are respectively connected directly to the individual jaws so that both jaws are provided with a wired conductive current path which does not rely upon the hinge to conduct current. This is an improvement over prior art electrode holders of the type which has one stationary jaw to which the cable is connected, and one spring-urged jaw which can carry only such current as is conducted through the hinge pivot pin assembly, whereby one jaw overheats while the other runs cool and the hinge assembly tends to be eaten away by arcing thereat, U.S. Pat. Nos. 2,186,158 to Weeks, and 2,472,177 to Taber being of the latter type.

THE INVENTION

The present electrode holder is of a type basically similar to the one disclosed in my U.S. Pat. No. 3,717,744, supra, and comprises a pair of jaw support members each having at one end a handle portion and having at the other end a jaw portion. These jaw support members are pivoted to an externally threaded tubular member having a sleeve screwed onto it which underlies the handle portions and can be screwed back and forth on the tubular member. A pair of springs are carried by a collar surrounding the tubular member, the position of the collar being adjusted by rotating the sleeve upon the threaded tubular member. The spring-holding collar urges two separate coil springs diagonally outwardly against the insides of the two handle portions of the jaw support members, and when the collar is adjusted axially along the tubular member it adjusts the spring pressure which presses the jaws toward closed position. The electric cable enters the electrode holder through the sleeve member and through the tubular member, and bifurcates into two flexible portions which are respectively connected to separate metal jaw pieces secured in the jaw portions.

It is a principal object of the invention to provide an improved electrode holder of the type specified in which the jaw support members are made entirely of insulating material and have metal pivot plates attached thereto which are hinged to the central tubular member of the holder, and in which metal electrode gripping jaw pieces are removably secured so that they are easily changeable, the jaw pieces being physically supported in insulated relationship with respect to each other and also with respect to the pivot assembly, and being connected separately to the incoming electrical cable, whereby the current flowing through each jaw member is individually carried to that jaw member by a separate conductor so that the other metal parts of the electrode holder do not carry any current and are therefore not subjected to eating away or arcing.

It is another major object of this invention to provide an electrode holder having two jaw members, each of which is pivoted to a central tubular member so that it can move independently of that member and of the other jaw member, each jaw member being urged toward the other by completely separate spring means, and the spring means being placed approximately the same distance from the pivot as the jaw members are spaced from the pivot, whereby approximately the same turning moment exists for the jaw members as for the spring members. This is a substantial improvement over my prior patent wherein the turning moment of the spring means urging the jaws closed was very small so that the spring action moment moved through only a very small distance during opening and closing of the jaws whereby a much greater spring force was required to provide adequate jaw-grip, thereby increasing the wear and the tendency to bind, and making the spring assembly more expensive to manufacture.

It is another object of the invention to provide a pair of springs which are located at such an angle with respect to the pivot that the springs, when their compressions are adjusted by moving the support collar, always occupy an operating axis which is very close to an optimum angle lying nearly tangent to a circle drawn about the pivot and passing through the center of the jaw pieces.

It is another important object of the invention to provide insulating cover plates on both sides of the electrode holder, which cover plates substantially conceal the metal parts such as the pivot plates against accidental contact which might result in a short circuit if the electrode holder is laid down upon a conductive surface connected to the welding current source. These cover plates are especially designed to require the changing of only one of the cover plates if it is heat damaged or otherwise worn away on the working side of the holder, and this is an improvement over the above mentioned patent in which both cover plates border on both sides of the jaw pieces so that both cover plates are worn or heat damaged no matter which side such wear occurs on.

It is a further object of this invention to provide a less expensive holder wherein the spring means are smaller and of lighter gauge, the metal jaw support structures have been eliminated and replaced by unitary molded plastic jaw support members, the cover plates have been simplified, and the cable clamp of the prior invention which clamps the main power cable to the bifurcated conductors leading to the jaw pieces has been replaced by a standard stainless steel hose clamp. The several jaw support members, pivot plates, springs, cover plates, etc., are all made so that identical parts can be used interchangeably in several locations. The various parts can be easily changed for replacement purposes, and the electrode holder itself can be installed upon or removed from a welding current cable easily and conveniently, these operations requiring the use of only a simple screwdriver.

Other objects and advantages of the invention will become apparent during the following discussion of the drawings.

THE DRAWINGS

FIG. 2 is a longitudinal sectional view on an enlarged scale taken along line 2—2 of FIG. 1;

FIG. 3 is a transverse sectional view taken along line 3—3 of FIG. 2;

FIG. 5 is a perspective view of one jaw support member of the type shown in FIGS. 1 and 2 and also showing in exploded relationship two pivot plates to be screwed thereto;

FIG. 8 is a detail view in perspective showing a spring holding collar.

Figure 1:
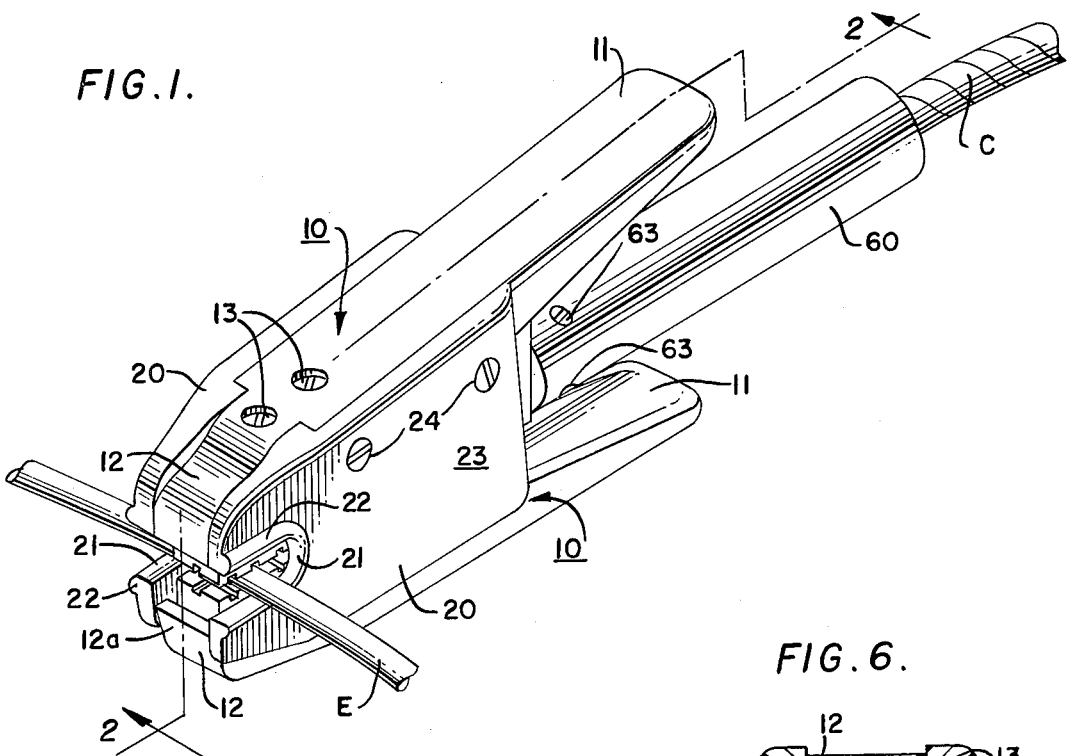
FIG. 1 is a perspective view of an electrode holder made according to the present invention and gripping a welding electrode between its jaws.
Figure 7:
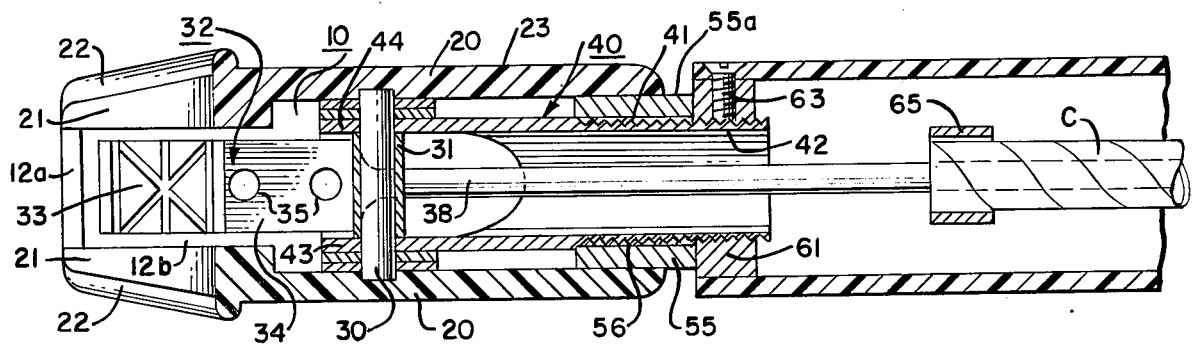
FIG. 7 is a longitudinal sectional view taken along line 7—7 of FIG. 2.

Referring now to the drawings, the perspective view of FIG. 1 shows an electrode holder according to the invention comprising two opposed jaw support members which are both labelled 10 since they are identical. Each member 10 has a handle portion 11 and a jaw portion 12, and the jaw portions are covered by cover plates 20. As can be seen in FIGS. 2 and 7, the jaw support members 10 are pivotally connected together by a pivot pin 30 in a manner to be hereinafter described. FIG. 7 further shows that the holder includes a tubular member 40 which is threaded externally at one end as shown at 41 and has an axial bore 42 extending therethrough. At the other end of the tubular member there are two lug portions 43 and 44 through which pivot holes have been provided in transverse alignment to receive the pivot pin 30.

Figure 6:
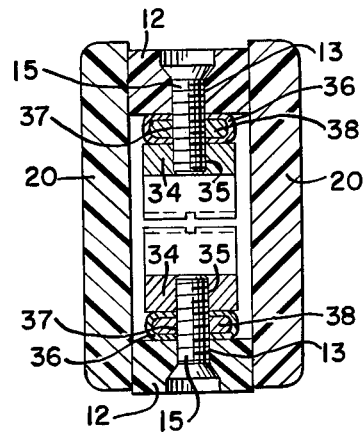
FIG. 6 is a transverse sectional view taken along line 6—6 of FIG. 2.

As can be seen best in the perspective view of FIG. 5 and in the sectional view of FIG. 2, each jaw support member 10 has a central portion 14 which supports pivot plates, and this central portion is located between the handle portion 11 and the jaw portion 12. The jaw portion 12 has a lip 12a joined by a flat portion 12b into which an electrode gripping jaw piece 32 is mounted by screws. The jaw pieces 32 are shown in FIGS. 2 and 7, and each comprises a knurled portion 33 which grips the electrode E, FIG. 1 and a mounting portion 34 having tapped mounting holes 35 therethrough which align with mounting holes 13 in the jaw support members 10. As can be seen in FIG. 6, machine screws 15 pass through the holes 13 and through the holes 37 in conductor members 38, two of which are used to carry the current from the jaw pieces 32 to the cable C which extends to a source of welding current, not shown. Each of the conductors 38 has its end sheathed by a flattened copper tube 36 through which holes 37 are drilled, FIG. 6. The screws passing through the jaw portion of the support member at the holes 13 then pass through the holes 37 in the conductors 38 and are screwed into tapped holes 35 in the jaw piece mounting portions 34.

Figure 4:
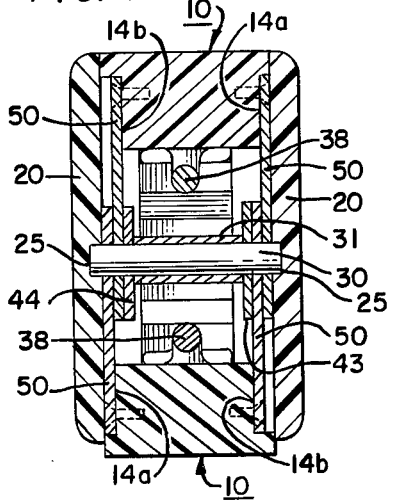
FIG. 4 is a sectional view taken through the pivot and along line 4—4 of FIG. 2.

Referring to FIGS. 4 and 5, each jaw support member 10 includes a portion 14 which has slots indented into its sides, the slots being labelled 14a and 14b. It should be noted that the slot 14b is deeper than the slot 14a and that both slots are shaped to receive the ends of pivot plates 50, which have two mounting holes 51 and 52 and a pivot hole 53 which receives the pivot pin 30, for example, as shown in FIGS. 2, 4, and 7. Since the slots 14a and 14b are of different depths, two identical jaw support members 10 equipped with the pivot plates 50 can be placed with their jaw pieces 32 face to face, and the pivot plates will be staggered out of mutual alignment when the pivot pin 30 is passed through them, FIG. 4. Behind the boss 14, each jaw support member 10 is cut away along a curve 16 which blends into the inner surface of the handle member 11, and a socket 17 is drilled into the face of the curved portion 16 to receive a compression spring 59 in the manner hereinafter discussed.

Within the two opposed jaw support members 10, which are placed so that their pivot plates 50 are in mutually overlapping engagement, the threaded tubular member 40 lies between the handle portions 11. The pivot pin passes through all four pivot plates 50 and through the two lugs 43 and 44. A fiber tube 31 is placed over the pivot pin 30 so that the conductors 38 will not make electric contact with the pin and possibly cause arcing thereat, which tends to eat away the pivot assembly.

It will be noted in FIG. 5 that the jaw-piece receiving surface 12b extends rearwardly to the shoulder 12c which is well behind the position of the pivot pin 30, thereby providing an access channel through which the two conductors 38 can pass around the pivot pin, while the portions 14 of the jaw support members center and guide the conductors 38 and prevent them from touching the sides of the pivot plates 50. The purpose of this structure is to prevent all contact between the metal parts 50 and 30 on the one hand, and the conductors 38 on the other hand.

A spring holding collar 55 as shown in FIG. 8 has a bore 56 therethrough which loosely surrounds the threaded portion 41 of the tubular member 40. This collar 55 is somewhat flattened as at 55a on two sides since the electrode holder is narrower in width as viewed in FIG. 7 than it is in height as viewed in FIG. 2. The spring holding collar has two sockets 57 sunk into diametrically spaced surfaces thereof, the front of the collar being bevelled at 58 so as to provide clearance as can be seen in FIG. 2, whereby when the handle portions 11 are pinched toward each other the bevelled surfaces 58 and the curved surfaces 16 will approach and touch each other when the jaw pieces 32 are fully opened.

It will be noted in FIG. 2 that a circle A has been drawn about the center of the pivot pin 30, the circle A extending through the electrode gripping portions 33 of the jaw pieces 32, this circle A also passing through the springs 59. This circle shows that the springs are located at about the same distance behind the pivot 30 as the jaw pieces 32 are in front of it, whereby the springs have about the same moment-arm leverage about the pivot 30 as the jaw pieces. The spring holding collar 55 is shown in FIG. 2 in such a position that its two sockets 57, the springs 59, and the sockets 17 in the handle portions of the support members 10 are all in mutual alignment, so that each spring and the sockets which support it lie along an axis which passes tangent approximately to the circle A. The word "approximately" is used because of the fact, as will be discussed hereinafter, that the collar 55 is moved back and forth on the threaded portion 41 of the tubular member 40 in order to adjust the compression force of the springs 59. When such adjustment occurs the axis through each spring, and its two sockets, changes its position and tilts somewhat so that at times it may be only approximately tangent to the circle A. However, changes in spring compression by moving the position of the collar 55 are made about an average position of tangency to the circle A.

Behind the spring holding collar, there is a sleeve member 60 which receives the cable C through its bore, the cable extending along the axis X which passes through the sleeve member 60 and the tubular member 40, and substantially intersects the pivot 30. At the forward end of the sleeve member 60 there is a nut 61 which is internally threaded as at 62. The threaded nut is screwed onto the external threads 41 of the tubular member 40, whereby when the sleeve 60 is rotated the nut 61 changes the axial position of the spring holding collar 55, thereby changing the degree of compression of the springs 59. The nut 61 is held in the sleeve 60 by screws 63. Within the sleeve 60 there is a stainless steel screw clamp 65 of the type used for hose clamping, the clamp surrounding an overlapping location where the cable C and the two conductors 38 are overlapped. The clamp 65 tightens the joint between the cable and the conductors, which is however easily removed by loosening the clamp. Access for loosening of the clamp can be easily accomplished by removing the screws 63 and sliding the sleeve 60 down the cable beyond the clamp 65.

FIGS. 1, 2 and 7 show insulating cover plates 20 which are used to cover the sides of the holder and which also serve the purpose of retaining the pin 30 in place. These plates 20 serve the important purpose of providing insulation against accidental electrical contact with the metal parts of the holder, for instance, at the sides of the jaw pieces 32, the pivot plates 50, or other exposed metallic members. Each cover plate 20 has a slotted mouth 21 with a thickened lip 22 which extends all the way around it. When the cover plates are mounted on the jaw support members 10, the mouth slots 21 are positioned so that the jaw pieces 32 intersect within them, for instance, as can be seen in FIG. 1. Each cover plate has an enlarged face portion 23 extending rearwardly from the mouth slot 21 and ending well behind the pivot pin 30 and behind the springs 59. The face portion 23 of each plate has two counter-sunk holes 24, FIG. 1, which align with tapped holes 18 in the jaw support members 10 to which the cover plates 20 are secured by screws. Note that each cover plate is secured by two screws to only one jaw member 10, whereby the other jaw member is free to open between the plates. Each cover plate is provided with a blind hole 25, FIG. 4 to receive the end of the pivot pin 30, thereby helping to center the cover plates on the assembly. The thickened lip portion 22 around the mouth slot 21 increases the life of the cover plate 20 since this is the area in which considerable damage to the plate occurs both by wear and also by heat from the electrode which passes closely between the lips 22.

The practice of using separate cover plates 20 each occupying only one side of the electrode holder, as distinguished from the practice of using two U-shaped plates each one of which covers both sides of one jaw as in my prior patent, is a substantial practical saving from the point of view that most of the wear and damage tends to occur on one side of the electrode holder, namely the side toward which the welding is being done. Therefore, when the cover plate is damaged in the vicinity of the jaws, it becomes necessary to replace only the one plate on the working side of the holder, rather than to replace both overlapping plates as in the structure shown in my previous patent, supra.

Other economies are achieved in the present structuure, which are attributable to the fact that less expensive parts are used, for instance, a less expensive clamp 65 for joining the cable C to the two conductors 38, less expensive jaw support members 10 molded substantially of one piece rather than using separate metal jaw supports and insulating handles which are then bolted together, less expensive and smaller springs 59, and less costly insulating cover plates 20 of reduced size and complexity.

In addition, improved durability is achieved as a result of insulating pivot members and springs more effectively with respect to heat conducted from the jaw pieces theretoward. Moreover, the advantageous placement of separate springs has provided an electrode clamping system which achieves better moment-arm leverage using lighter weight springs which are spaced substantially the same distance from the pivot 30 as are the jaw pieces.

The present invention is not to be limited to the exact structure shown in the drawings, for obviously changes may be made within the scope of the following claims:

1. A holder for supporting a welding electrode and connecting it to a current carrying cable entering the holder, comprising:
   a. an externally threaded tubular member having an axial bore therethrough receiving said cable at one end and having a transversely disposed pivot at the other end;
   b. a pair of jaw support members disposed on opposite sides of said tubular member and each connected intermediate its ends with said pivot, each of the support members having a handle portion at one end overlying the tubular member and having at its other end a jaw portion extending beyond the pivot and having electrode gripping means, the electrode gripping means on the jaw support portions of the paired support members being mutually opposed;
   c. a spring holding collar surrounding the tubular member and axially positionable thereon beneath said handle portions, the collar having spring locating means facing outwardly toward each handle portion, and the handle portions of the jaw support members each having a spring locating means facing toward said collar;
   d. a pair of springs mounted in said spring locating means and each extending between the collar and a different one of said handle portions, thereby urging the handle portions apart and the jaw portions together, the springs and locating means being located at about the same distance from the pivot as the electrode gripping means of the jaw portions and on the other side of the pivot therefrom;
   e. conductor means joining said electrode gripping means to said cable; and
   f. sleeve means threadedly engaging said tubular member and abutting said collar, and operative to adjust the compression of said springs when the sleeve means is screwed axially back and forth on the tubular member.

2. In a holder as set forth in claim 1, said jaw support members being made of insulating material, and the electrode gripping means comprising removable metal jaw pieces having knurled surfaces opposing each other when the jaw pieces are fixed in place on the support members, and said conductor means comprising separate flexible wires each secured at one end to one of said jaw pieces and secured at the other end to said cable, the flexible wires passing through the tubular member past said pivot.

3. In a holder as set forth in claim 2, screw means passing through the jaw portions of the support members and removably securing the conductor means and the jaw pieces thereto.

4. In a holder as set forth in claim 1, wherein said jaw support members are made of insulating material, metal pivot plates secured to both sides of the jaw support member intermediate their ends, the pivot plates being hinged to the pivot on the tubular member and being insulated from said electrode gripping means.

5. In a holder as set forth in claim 1, said spring locating means comprising opposed sockets in the collar and in the handle portions, and said springs comprising separate coiled compression springs each extending from a socket in a handle portion to a socket in the collar.

6. In a holder as set forth in claim 5, each of said socket means and springs having its axis approximately tangent to a circle drawn about said pivot and passing through the center of said electrode gripping means.

7. In a holder as set forth in claim 1, said jaw portions and handle portions of the support members and said sleeve means being made of electrical and heat insulating material, whereby the heat from the welding electrode is insulated from conduction to the springs, and the holder is electrically insulated on its exterior surfaces.

8. In a holder as set forth in claim 1, a pair of cover plates made of insulating material located on opposite sides of said jaw portions of the support members, each cover plate being secured to the side of one of the jaw portions which it overlies, and each cover plate having a slot therein for passing electrodes into and out of the jaws, the slots having thickened lips surrounding them to increase their wear life.

9. In a holder as set forth in claim 1, said conductor means overlapping said cable within the sleeve means, and a hose clamp around their intersection and tightened thereon to secure the joint.

* * * * *